United States Patent
Wu et al.

(10) Patent No.: US 12,423,797 B2
(45) Date of Patent: Sep. 23, 2025

(54) METHOD FOR SELECTING A LIGHT SOURCE FOR ILLUMINATING DEFECTS, ELECTRONIC DEVICE, AND NON-TRANSITORY STORAGE MEDIUM

(71) Applicant: HON HAI PRECISION INDUSTRY CO., LTD., New Taipei (TW)

(72) Inventors: Chung-Yu Wu, New Taipei (TW); Chin-Pin Kuo, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 949 days.

(21) Appl. No.: 17/530,689

(22) Filed: Nov. 19, 2021

(65) Prior Publication Data
US 2022/0198634 A1 Jun. 23, 2022

(30) Foreign Application Priority Data
Dec. 22, 2020 (CN) .......................... 202011530849.1

(51) Int. Cl.
*G06T 7/00* (2017.01)
*G01N 21/01* (2006.01)
*G01N 21/88* (2006.01)

(52) U.S. Cl.
CPC ............ *G06T 7/001* (2013.01); *G01N 21/01* (2013.01); *G01N 21/8851* (2013.01); *G01N 2201/061* (2013.01); *G06T 2207/10152* (2013.01); *G06T 2207/20221* (2013.01)

(58) Field of Classification Search
CPC ........... G06T 7/001; G06T 2207/10152; G06T 2207/20221; G06T 7/0004; G01N 21/01; G01N 21/8851; G01N 2201/061; G01N 21/314; G01N 2021/8845; G01N 21/8806; G01N 2021/8809; G01J 1/42; G01J 3/28; G01J 2001/4247
See application file for complete search history.

(56) References Cited

FOREIGN PATENT DOCUMENTS

| CN | 101282489 | 10/2008 | |
|---|---|---|---|
| CN | 105632413 | 6/2016 | |
| CN | 109348731 A | * 2/2019 | ........... G06K 9/6202 |
| CN | 110263777 | 9/2019 | |

OTHER PUBLICATIONS

Choa et al., "Detection of cuticle defects on cherry tomatoes using hyperspectral fluorescence imagery", pub. 2013 (Year: 2013).*
Byoung-Kwan Choa et al., "Detection of cuticle defects on cherry tomatoes using hyperspectral fluorescence imagery", pub. 2013 (Year: 2013).*

* cited by examiner

*Primary Examiner* — Mekonen T Bekele
(74) *Attorney, Agent, or Firm* — ScienBiziP, P.C.

(57) ABSTRACT

A method for selecting a light source for illuminating defects, an electronic device, and a non-transitory storage medium are provided. The method includes acquire grayscale images of an object with a known defect and generates a pseudo-hyperspectral image cube based on the grayscale images, so that algorithms related to hyperspectral images can analyze the grayscale images collected under different light sources. A most effective or target light source can be automatically and quickly determined from the plurality of light sources, improving an efficiency of light source selection.

17 Claims, 2 Drawing Sheets

METHOD FOR SELECTING A LIGHT SOURCE FOR ILLUMINATING DEFECTS, ELECTRONIC DEVICE, AND NON-TRANSITORY STORAGE MEDIUM

FIELD

The present disclosure relates to a technical field of image processing, specifically a method for selecting a light source for illuminating defects, an electronic device, and a non-transitory storage medium.

BACKGROUND

Automated optical inspection can be used to detect whether a manufactured or other object has defects, but in practice, a large amount of experimentation is required to determine a light source suitable for highlighting a certain type of defect of the object, such experimentation may be time consuming.

Therefore, selecting the light source is a technical problem to be solved.

DETAILED DESCRIPTION

The accompanying drawings combined with the detailed description illustrate the embodiments of the present disclosure hereinafter. It is noted that embodiments of the present disclosure and features of the embodiments can be combined, when there is no conflict.

Various details are described in the following descriptions for a better understanding of the present disclosure, however, the present disclosure may also be implemented in other ways other than those described herein. The scope of the present disclosure is not to be limited by the specific embodiments disclosed below.

Unless defined otherwise, all technical and scientific terms used herein have the same meaning as commonly understood by one of ordinary skill in the art to which the present disclosure belongs. The terms used herein in the present disclosure are only for the purpose of describing specific embodiments and are not intended to limit the present disclosure.

Optionally, the method for selecting a light source of the present disclosure is applied to one or more electronic devices. The electronic device includes hardware such as, but not limited to, a microprocessor and an Application Specific Integrated Circuit (ASIC), Field-Programmable Gate Array (FPGA), Digital Signal Processor (DSP), embedded devices, etc.

The electronic device may be a device such as a desktop computer, a notebook, a palmtop computer, or a cloud server. The electronic device can interact with users through a keyboard, a mouse, a remote control, a touch panel, or a voice control device.

Figure 1:
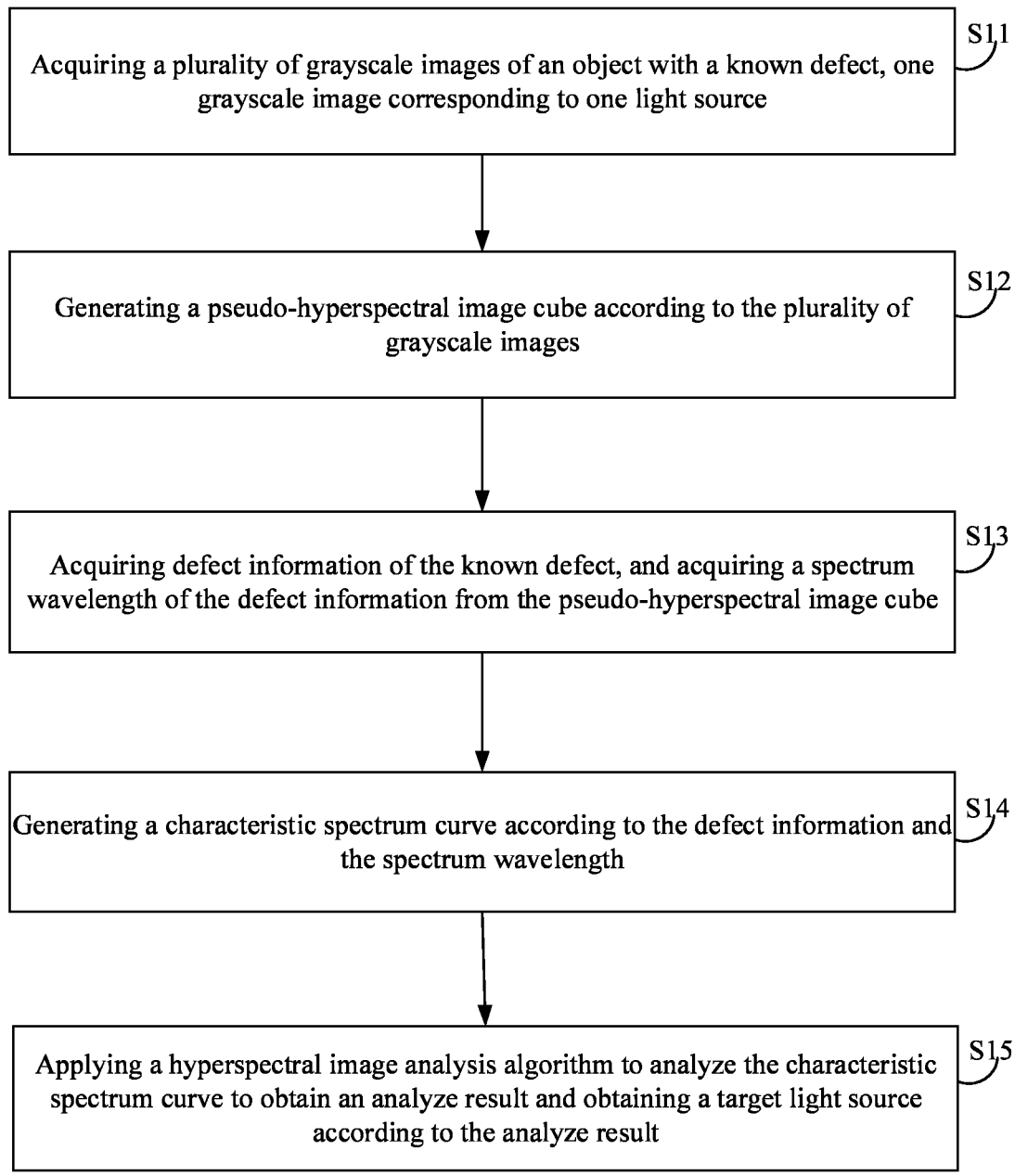
FIG. 1 shows a flowchart of a method for selecting a light source for illuminating defects provided in an embodiment of the present disclosure.

FIG. 1 is a flowchart of a method for selecting a light source suitable for revealing specific defects by illumination, in an embodiment of the present disclosure. The method for selecting a light source for illuminating defects is applied to electronic devices. According to different needs, the order of the steps in the flowchart can be changed, and some can be omitted.

In block S11, acquiring a plurality of grayscale images of an object with a known defect, one grayscale image corresponding to one light source.

The object has a known defect, such as one or more scratches, depressions, stains, and the like.

A grayscale image is a monochrome image with a 256-level grayscale color gamut or level, from black to white.

In some embodiments, the method of acquiring the plurality of grayscale images of an object with a known defect includes acquiring an image of the object under each of a plurality of light sources and converting each of the acquired image through a gray scale conversion algorithm to obtain the plurality of grayscale images.

Grayscale images of the object in a fixed position and with the known defect are captured, and grayscale image collection of n light sources is performed to obtain n grayscale images, where each image has a length of h, a width of w, and an image size of h*w.

The light sources may include, but are not limited to, light sources of different light intensities, light sources of different colors, and other specialized light sources.

In some embodiments, the gray scale conversion algorithm includes any one of a floating-point algorithm, an integer algorithm, a shift algorithm, an average value algorithm, and a green-only algorithm.

Any color is composed of three primary colors of red, green, and blue. If a pixel is providing RGB (R, G, B) color combinations, then using the floating-point algorithm, the integer algorithm, the shift algorithm, the average value algorithm, and the green-only algorithm, the color image can be converted into a grayscale image. The floating-point algorithm can be: Gray=R*0.3+G*0.59+B*0.11; the integer algorithm can be: Gray=(R*30+G*59+B*11)/100; the shift algorithm can be: Gray=(R*28+G*151+B*77)>>8; the average value algorithm can be: Gray=(R+G+B)/3; the green-only algorithm can be: Gray=G.

In block S12, generating a pseudo-hyperspectral image cube according to the plurality of grayscale images.

In some embodiments, the method of generating the pseudo-hyperspectral image cube according to the plurality of grayscale images includes performing a three-dimensional fusion of the plurality of grayscale images to obtain the pseudo-hyperspectral image cube.

A width of the pseudo-hyperspectral image cube is a width of the grayscale image, and a length of the pseudo-hyperspectral image cube is a length of the grayscale image, and a height of the pseudo-hyperspectral image cube is a number of the plurality of grayscale images.

In another embodiment, since each grayscale image is a two-dimensional image, and different light sources correspond to different spectrum wavelengths, the spectrum wavelength is taken as a third dimension (the length of the grayscale image is taken as a first dimension, the width of the grayscale image is taken as a second dimension), and the plurality of grayscale images are mapped to the third dimension, then the pseudo-hyperspectral image cube can be obtained.

In some embodiments, after generating the pseudo-hyperspectral image cube according to the plurality of grayscale images, the method further includes: performing hyperspectral image analysis on the pseudo-hyperspectral image cube according to a preset analysis algorithm to obtain data (HIA data), and saving the HIA data in a database.

In some embodiments, the preset analysis algorithm may include any one of a waveband selection algorithm and an orthogonal subspace projection algorithm. From all the wavebands of the hyperspectral image, the waveband selection algorithm is able to select a subset of the wavebands that are playing a major role, which can not only greatly reduce the dimension of the HIA data of the hyperspectral image, but also can more completely retain useful information. The orthogonal subspace projection algorithm is a linear transformation from a vector space to itself.

In the above embodiment, the hyperspectral image analysis is performed on the pseudo-hyperspectral image cube according to the preset analysis algorithm, and more image information can be obtained from a perspective of a hyperspectral image, which can be used for various subsequent analyses.

In block S13, acquiring defect information of the known defect, and acquiring a spectrum wavelength of the defect information from the pseudo-hyperspectral image cube.

The defect information may be pixel information corresponding to the known defect in the grayscale image.

Since an area corresponding to the known defect of the object in each grayscale image is known and fixed, the spectrum wavelength corresponding to the area corresponding to the known defect in each gray scale image in the pseudo-hyperspectral image cube can be found.

In block S14, generating a characteristic spectrum curve according to the defect information and the spectrum wavelength.

The spectrum wavelengths corresponding to the plurality of light sources and the defect information can be fitted to generate the characteristic spectrum curve, a horizontal axis characteristic spectral curve representing the spectrum wavelength, and a vertical axis representing the defect information. One kind of wavelength band in the characteristic spectral curve corresponds to one kind of light source.

In block S15, applying a hyperspectral image analysis algorithm to analyze the characteristic spectrum curve to obtain an analyze result and obtaining a target light source according to the analyze result.

According to characteristics of the defect information, and hyperspectral image analysis methods such as the waveband selection method, the orthogonal subspace projection algorithms and other algorithms can be used to determine a spectrum wavelength that effectively highlights the known defect. Specifically, the target waveband is selected so that a difference between the spectrum wavelength of the known defect in the target waveband and a spectrum wavelength of the background (the part of the image around, behind, and including the object itself except for the known defect) is the greatest. A light source corresponding to the target waveband will be the selected target light source.

In some embodiments, after obtaining a target light source according to the analyze result, the method further includes acquiring an image of a target object to be detect under the target light source; and performing an optical detection on the image of the target object to obtain a result of detection or non-detection of a defect, wherein the result is used to determine whether the target object has the known defect.

For a target object of undetermined defect-status, the target object can be used as the object to be detected. An image of the target object under detected can be acquired, and then an automatic optical inspection is performed on the image of the target object to determine whether the target object has the known defect according to the detection or non-detection.

Automatic optical inspection (AOI) is a technology used to detect whether there are defects in objects, and is mostly used to monitor production processes. It typically includes detailed defect classification and component placement offset information.

The method provided in the present disclosure can generate the pseudo-hyperspectral image cubes based on the plurality of grayscale images of objects with known defects, so that algorithms related to analysis of hyperspectral images can be used to analyze these grayscale images collected under different light sources, and then quickly determine the target light source from a plurality of light sources, which improves an efficiency of light source selection.

Figure 2:
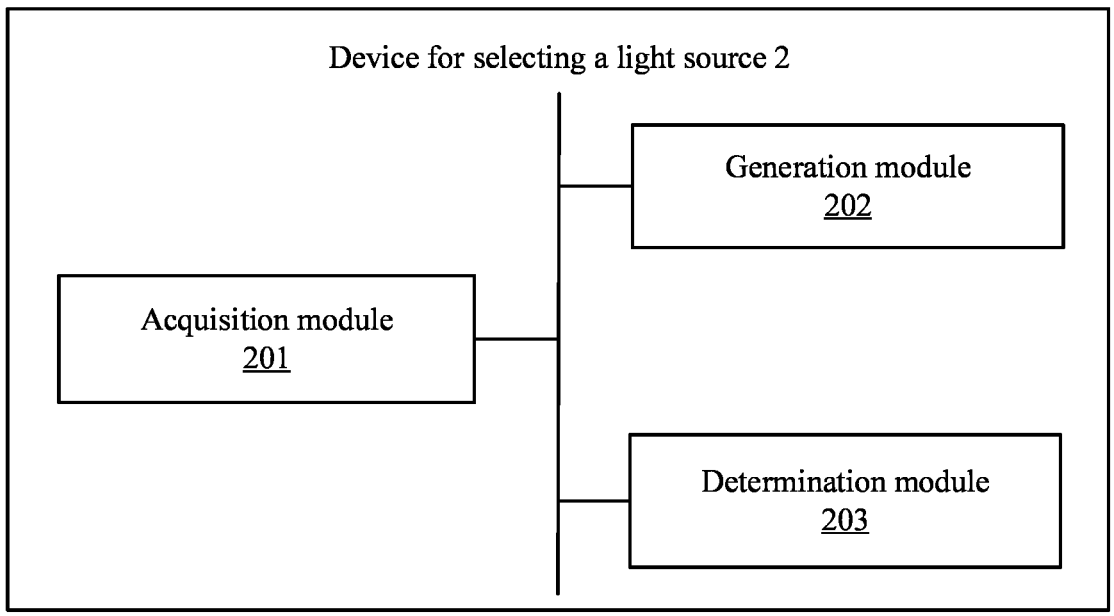
FIG. 2 shows a schematic structural diagram of a device for selecting a light source for illuminating defects provided in an embodiment of the present disclosure.

FIG. 2 shows a schematic structural diagram of a device for selecting a light source for illuminating defects provided in the embodiment of the present disclosure.

In some embodiments, the device for selecting a light source 2 suitable for revealing specific defects by illumination, runs in an electronic device. The device for selecting a light source 2 can include a plurality of function modules consisting of program code segments. The program code of each program code segments in the device for selecting a light source 2 can be stored in a memory and executed by at least one processor to perform image processing (described in detail in FIG. 2).

As shown in FIG. 2, the device for selecting a light source 2 can include: an acquisition module 201, a generation module 202, and a determination module 203. A module as referred to in the present disclosure refers to a series of computer-readable instruction segments that can be executed by at least one processor and that are capable of performing fixed functions, which are stored in a memory. In some embodiment, the functions of each module will be detailed.

The above-mentioned integrated unit implemented in a form of software functional modules can be stored in a non-transitory readable storage medium. The above software function modules are stored in a storage medium and include several instructions for causing an electronic device (which can be a personal computer, a dual-screen device, or a network device) or a processor to execute the method described in various embodiments in the present disclosure.

The acquisition module 201 acquires a plurality of grayscale images of an object with a known defect, one grayscale image corresponding to one light source.

The object has a known defect, such as one or more scratches, depressions, stains, and the like.

A grayscale image is a monochrome image with a 256-level grayscale color gamut or level, from black to white.

In some embodiments, the acquisition module 201 acquiring the plurality of grayscale images of an object with a known defect includes: acquiring an image of the object under each of a plurality of light sources and converting each of the acquired image through a gray scale conversion algorithm to obtain the plurality of grayscale images.

Grayscale images of the object in a fixed position and with the known defect are captured, and grayscale image collection of n light sources is performed to obtain n grayscale images, where each image has a length of h, a width of w, and an image size of h*w.

The light sources may include, but are not limited to, light sources of different light intensities, light sources of different colors, and other specialized light sources.

In some embodiments, the gray scale conversion algorithm includes any one of a floating-point algorithm, an integer algorithm, a shift algorithm, an average value algorithm, and a green-only algorithm.

Any color is composed of three primary colors of red, green, and blue. If a pixel is providing RGB (R, G, B) color combinations, then using the floating-point algorithm, the integer algorithm, the shift algorithm, the average value algorithm, and the green-only algorithm, the color image can be converted into a grayscale image. The floating-point algorithm can be: Gray=R*0.3+G*0.59+B*0.11; the integer algorithm can be: Gray=(R*30+G*59+B*11)/100; the shift algorithm can be: Gray=(R*28+G*151+B*77)>>8; the average value algorithm can be: Gray=(R+G+B)/3; the green-only algorithm can be: Gray=G.

The generation module 202 generates a pseudo-hyperspectral image cube according to the plurality of grayscale images.

In some embodiments, the generation module 202 generating the pseudo-hyperspectral image cube according to the plurality of grayscale images includes performing a three-dimensional fusion of the plurality of grayscale images to obtain the pseudo-hyperspectral image cube.

A width of the pseudo-hyperspectral image cube is a width of the grayscale image, and a length of the pseudo-hyperspectral image cube is a length of the grayscale image, and a height of the pseudo-hyperspectral image cube is a number of the plurality of grayscale images.

In another embodiment, since each grayscale image is a two-dimensional image, and different light sources correspond to different spectrum wavelengths, the spectrum wavelength is taken as a third dimension (the length of the grayscale image is taken as a first dimension, the width of the grayscale image is taken as a second dimension), and the plurality of grayscale images are mapped to the third dimension, then the pseudo-hyperspectral image cube can be obtained.

In some embodiments, after generating the pseudo-hyperspectral image cube according to the plurality of grayscale images, the analysis module performs hyperspectral image analysis on the pseudo-hyperspectral image cube according to a preset analysis algorithm to obtain data (HIA data) and saving the HIA data in a database.

In some embodiments, the preset analysis algorithm may include any one of a waveband selection algorithm and an orthogonal subspace projection algorithm. From all the wavebands of the hyperspectral image, the waveband selection algorithm is able to select a subset of the wavebands that are playing a major role, which can not only greatly reduce the dimension of the HIA data of the hyperspectral image, but also can more completely retain useful information. The orthogonal subspace projection algorithm is a linear transformation from a vector space to itself.

In the above embodiment, the hyperspectral image analysis is performed on the pseudo-hyperspectral image cube according to the preset analysis algorithm, and more image information can be obtained from a perspective of a hyperspectral image, which can be used for various subsequent analyses.

The acquisition module 201 acquires defect information of the known defect and acquires a spectrum wavelength of the defect information from the pseudo-hyperspectral image cube.

The defect information may be pixel information corresponding to the known defect in the grayscale image.

Since an area corresponding to the known defect of the object in each grayscale image is known and fixed, the spectrum wavelength corresponding to the area corresponding to the known defect in each gray scale image in the pseudo-hyperspectral image cube can be found.

The generation module 202 generates a characteristic spectral curve according to the defect information and the spectrum wavelength.

The spectrum wavelengths corresponding to the plurality of light sources and the defect information can be fitted to generate the characteristic spectral curve, a horizontal axis characteristic spectral curve representing the spectrum wavelength, and a vertical axis representing the defect information. One kind of wavelength band in the characteristic spectral curve corresponds to one kind of light source.

The determination module 203 applies a hyperspectral image analysis algorithm to analyze the characteristic spectral curve to obtain an analyze result and obtains a target light source according to the analyze result.

According to characteristics of the defect information, and hyperspectral image analysis methods such as the waveband selection method, the orthogonal subspace projection algorithms and other algorithms can be used to determine a spectrum wavelength that effectively highlights the known defect. Specifically, the target waveband is selected so that a difference between the spectrum wavelength of the known defect in the target waveband and a spectrum wavelength of the background (the part of the image around, behind, and including the object itself except for the known defect) is the greatest. A light source corresponding to the target waveband will be the selected target light source.

In some embodiments, after obtaining a target light source according to the analyze result, the acquisition module 201 acquires an image of a target object to be detect under the target light source; and the determination module 203 performs an optical detection on the image of the target object to obtain a result of detection or non-detection of a defect, wherein the result is used to determine whether the target object has the known defect.

For a target object of undetermined defect-status, the target object can be used as the object to be detected. An image of the target object under detected can be acquired, and then an automatic optical inspection is performed on the image of the target object to determine whether the target object has the known defect according to the detection or non-detection.

Automatic optical inspection (AOI) is a technology used to detect whether there are defects in objects, and is mostly used to monitor production processes. It typically includes detailed defect classification and component placement offset information.

The device provided in the present disclosure can generate the pseudo-hyperspectral image cubes based on the plurality of grayscale images of objects with known defects, so that algorithms related to analysis of hyperspectral images can be used to analyze these grayscale images collected under different light sources, and then quickly determine the target light source from a plurality of light sources, which improves an efficiency of light source selection.

The embodiment also provides a non-transitory readable storage medium having computer-readable instructions stored therein. The computer-readable instructions are executed by a processor to implement the steps in the above-mentioned method for selecting a light source, such as in steps in blocks S11-S15 shown in FIG. 1:

In block S11, acquiring a plurality of grayscale images of an object with a known defect, one grayscale image corresponding to one light source;

In block S12, generating a pseudo-hyperspectral image cube according to the plurality of grayscale images;

In block S13, acquiring defect information of the known defect, and acquiring a spectrum wavelength of the defect information from the pseudo-hyperspectral image cube;

In block S14, generating a characteristic spectrum curve according to the defect information and the spectrum wavelength;

In block S15, applying a hyperspectral image analysis algorithm to analyze the characteristic spectrum curve to obtain an analyze result and obtaining a target light source according to the analyze result.

The computer-readable instructions are executed by the processor to realize the functions of each module/unit in the above-mentioned device embodiments, such as the modules 201-203 in FIG. 2:

The acquisition module 201 acquires a plurality of grayscale images of an object with a known defect, one grayscale image corresponding to one light source;

The generation module 202 generates a pseudo-hyperspectral image cube according to the plurality of grayscale images;

The acquisition module 201 acquires defect information of the known defect, and acquires a spectrum wavelength of the defect information from the pseudo-hyperspectral image cube;

The acquisition module 201 generates a characteristic spectrum curve according to the defect information and the spectrum wavelength;

The determination module 203 applies a hyperspectral image analysis algorithm to analyze the characteristic spectrum curve to obtain an analyze result and obtains a target light source according to the analyze result.

Figure 3:
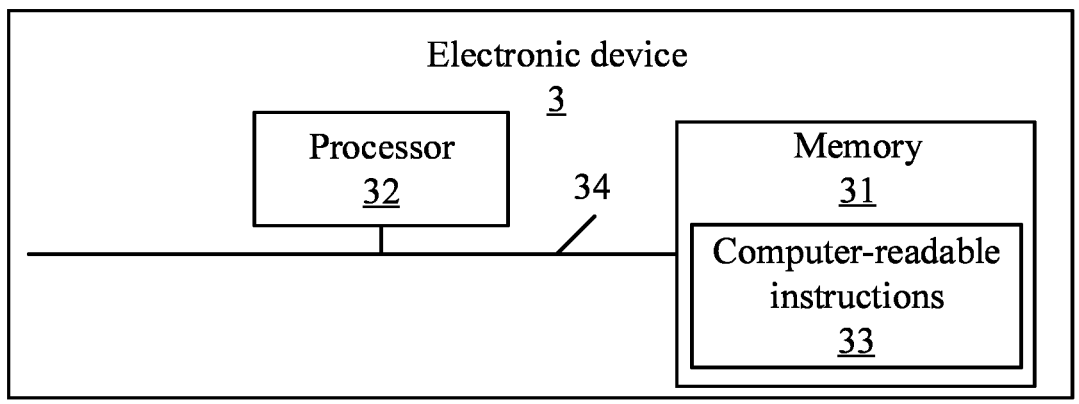
FIG. 3 shows a schematic structural diagram of an electronic device provided in an embodiment of the present disclosure.

FIG. 3 is a schematic structural diagram of an electronic device provided in an embodiment of the present disclosure. The electronic device 3 may include: a memory 31, at least one processor 32, and computer-readable instructions 33 stored in the memory 31 and executable on the at least one processor 32, for example, selecting a light source for illuminating defects programs, and a communication bus 34. The processor 32 executes the computer-readable instructions 33 to implement the steps in the embodiment of the method for selecting a light source, such as in steps in block S11-S15 shown in FIG. 1. Alternatively, the processor 32 executes the computer-readable instructions 33 to implement the functions of the modules/units in the foregoing device embodiments, such as the modules 201-203 in FIG. 2.

For example, the computer-readable instructions 33 can be divided into one or more modules/units, and the one or more modules/units are stored in the memory 31 and executed by the at least one processor 32. The one or more modules/units can be a series of computer-readable instruction segments capable of performing specific functions, and the instruction segments are used to describe execution processes of the computer-readable instructions 33 in the electronic device 3. For example, the computer-readable instruction can be divided into the acquisition module 201, the generation module 202, and the determination module 203 as in FIG. 2.

The electronic device 3 can be an electronic device such as a desktop computer, a notebook, a palmtop computer, and a cloud server. Those skilled in the art will understand that the schematic diagram 3 is only an example of the electronic device 3 and does not constitute a limitation on the electronic device 3. Another electronic device 3 may include more or fewer components than shown in the figures or may combine some components or have different components. For example, the electronic device 3 may further include an input/output device, a network access device, a bus, and the like.

The at least one processor 32 can be a central processing unit (CPU), or can be another general-purpose processor, digital signal processor (DSPs), application-specific integrated circuit (ASIC), Field-Programmable Gate Array (FPGA), another programmable logic device, discrete gate, transistor logic device, or discrete hardware component, etc. The processor 32 can be a microprocessor or any conventional processor. The processor 32 is a control center of the electronic device 3 and connects various parts of the entire electronic device 3 by using various interfaces and lines.

The memory 31 can be configured to store the computer-readable instructions 33 and/or modules/units. The processor 32 may run or execute the computer-readable instructions 33 and/or modules/units stored in the memory 31 and may call up data stored in the memory 31 to implement various functions of the electronic device 3. The memory 31 mainly includes a storage program area and a storage data area. The storage program area may store an operating system, and an application program required for at least one function (such as a sound playback function, an image playback function, etc.), etc. The storage data area may store data (such as audio data, phone book data, etc.) created according to the use of the electronic device 3. In addition, the memory 31 may include a high-speed random access memory, and may also include a non-transitory storage medium, such as a hard disk, an internal memory, a plug-in hard disk, a smart media card (SMC), a secure digital (SD) Card, a flashcard, at least one disk storage device, a flash memory device, or another non-transitory solid-state storage device.

When the modules/units integrated into the electronic device 3 are implemented in the form of software functional units having been sold or used as independent products, they can be stored in a non-transitory readable storage medium. Based on this understanding, all or part of the processes in the methods of the above embodiments implemented by the present disclosure can also be completed by related hardware instructed by computer-readable instructions 33. The computer-readable instructions 33 can be stored in a non-transitory readable storage medium. The computer-readable instructions 33, when executed by the processor, may implement the steps of the foregoing method embodiments. The computer-readable instructions 33 include computer-readable instruction codes, and the computer-readable instruction codes can be in a source code form, an object code form, an executable file, or some intermediate form. The non-transitory readable storage medium can include any entity or device capable of carrying the computer-readable instruction code, such as a recording medium, a U disk, a mobile hard disk, a magnetic disk, an optical disk, a computer memory, or a read-only memory (ROM).

In the several embodiments provided in the preset application, the disclosed electronic device and method can be implemented in other ways. For example, the embodiments of the devices described above are merely illustrative. For example, divisions of the units are only logical function divisions, and there can be other manners of division in actual implementation.

In addition, each functional unit in each embodiment of the present disclosure can be integrated into one processing unit, or can be physically present separately in each unit or two or more units can be integrated into one unit. The above modules can be implemented in a form of hardware or in a form of a software functional unit.

The present disclosure is not limited to the details of the above-described exemplary embodiments, and the present disclosure can be embodied in other specific forms without departing from the spirit or essential characteristics of the present disclosure. Therefore, the present embodiments are to be considered as illustrative and not restrictive, and the scope of the present disclosure is defined by the appended claims. All changes and variations in the meaning and scope of equivalent elements are included in the present disclosure. Any reference sign in the claims should not be construed as limiting the claim. Furthermore, the word "comprising" does not exclude other units nor does the singular exclude the plural. A plurality of units or devices stated in the system claims may also be implemented by one unit or device through software or hardware. Words such as "first" and "second" are used to indicate names, but not in any particular order.

Finally, the above embodiments are only used to illustrate technical solutions of the present disclosure and are not to be taken as restrictions on the technical solutions. Although the present disclosure has been described in detail with reference to the above embodiments, those skilled in the art should understand that the technical solutions described in one embodiment can be modified, or some of the technical features can be equivalently substituted, and that these modifications or substitutions are not to detract from the essence of the technical solutions or from the scope of the technical solutions of the embodiments of the present disclosure.

What is claimed is:

1. A method for selecting a light source for illuminating defects, the method comprising:
    acquiring a plurality of grayscale images of an object with a known defect, one grayscale image corresponding to one light source;
    generating a pseudo-hyperspectral image cube according to the plurality of grayscale images, comprising:
        obtaining the pseudo-hyperspectral image cube by performing a three-dimensional fusion of the plurality of grayscale images, wherein a width of the pseudo-hyperspectral image cube is a width of the grayscale image, and a length of the pseudo-hyperspectral image cube is a length of the grayscale image, and a height of the pseudo-hyperspectral image cube is a number of the plurality of grayscale images;
    acquiring defect information of the known defect, and acquiring a spectrum wavelength of the defect information from the pseudo-hyperspectral image cube;
    generating a characteristic spectrum curve according to the defect information and the spectrum wavelength; and
    applying a hyperspectral image analysis algorithm to analyze the characteristic spectrum curve to obtain an analyze result and obtaining a target light source according to the analyze result.

2. The method according to claim 1, wherein acquiring the plurality of grayscale images of an object with a known defect comprises:
    acquiring an image of the object under each of a plurality of light sources; and
    converting each of the acquired image through a gray scale conversion algorithm to obtain the plurality of grayscale images.

3. The method according to claim 2, wherein the gray scale conversion algorithm comprises any one of a floating-point algorithm, an integer algorithm, a shift algorithm, an average value algorithm, and a green-only algorithm.

4. The method according to claim 1, the method further comprising:
    performing hyperspectral image analysis on the pseudo-hyperspectral image cube according to a preset analysis algorithm to obtain data, after generating the pseudo-hyperspectral image cube according to the plurality of grayscale images; and
    saving the data in a database.

5. The method according to claim 4, wherein the preset analysis algorithm comprises any one of a waveband selection algorithm and an orthogonal subspace projection algorithm.

6. The method according to claim 5, the method further comprising:
    acquiring an image of a target object to be detect under the target light source, after obtaining a target light source according to the analyze result;
    performing an optical detection on the image of the target object to obtain a result of detection or non-detection of a defect, wherein the result is used to determine whether the target object has the known defect.

7. An electronic device comprising a memory and a processor, the memory stores at least one computer-readable instruction, which when executed by the processor causes the processor to:
    acquire a plurality of grayscale images of an object with a known defect, one grayscale image corresponding to one light source, comprising: obtaining the pseudo-hyperspectral image cube by performing a three-dimensional fusion of the plurality of grayscale images, wherein a width of the pseudo-hyperspectral image cube is a width of the grayscale image, and a length of the pseudo-hyperspectral image cube is a length of the grayscale image, and a height of the pseudo-hyperspectral image cube is a number of the plurality of grayscale images;
    generate a pseudo-hyperspectral image cube according to the plurality of grayscale images;
    acquire defect information of the known defect, and acquire a spectrum wavelength of the defect information from the pseudo-hyperspectral image cube;
    generate a characteristic spectrum curve according to the defect information and the spectrum wavelength; and
    apply a hyperspectral image analysis algorithm to analyze the characteristic spectrum curve to obtain an analyze result and obtain a target light source according to the analyze result.

8. The device for selecting a light source according to claim 7, wherein the processor acquires the plurality of grayscale images of an object with a known defect by:
    acquiring an image of the object under each of a plurality of light sources; and
    converting each of the acquired image through a gray scale conversion algorithm to obtain the plurality of grayscale images.

9. The device for selecting a light source according to claim 8, wherein the gray scale conversion algorithm comprises any one of a floating-point algorithm, an integer algorithm, a shift algorithm, an average value algorithm, and a green-only algorithm.

10. The device for selecting a light source according to claim 7, wherein the processor is further caused to:
    perform hyperspectral image analysis on the pseudo-hyperspectral image cube according to a preset analysis algorithm to obtain data, after generating the pseudo-hyperspectral image cube according to the plurality of grayscale images; and save the data in a database.

11. The device for selecting a light source according to claim 9, wherein the preset analysis algorithm comprises any one of a waveband selection algorithm and an orthogonal subspace projection algorithm.

12. The device for selecting a light source according to claim 11, wherein the processor is further caused to:

acquire an image of a target object to be detect under the target light source, after obtaining a target light source according to the analyze result;

perform an optical detection on the image of the target object to obtain a result of detection or non-detection of a defect, wherein the result is used to determine whether the target object has the known defect.

13. A non-transitory storage medium having stored thereon at least one computer-readable instructions that, when the at least one computer-readable instructions are executed by a processor to implement a method for selecting a light source for illuminating defects, which comprises:

acquiring a plurality of grayscale images of an object with a known defect, one grayscale image corresponding to one light source;

generating a pseudo-hyperspectral image cube according to the plurality of grayscale images, comprising: obtaining the pseudo-hyperspectral image cube by performing a three-dimensional fusion of the plurality of grayscale images, wherein a width of the pseudo-hyperspectral image cube is a width of the grayscale image, and a length of the pseudo-hyperspectral image cube is a length of the grayscale image, and a height of the pseudo-hyperspectral image cube is a number of the plurality of grayscale images;

acquiring defect information of the known defect, and acquiring a spectrum wavelength of the defect information from the pseudo-hyperspectral image cube;

generating a characteristic spectrum curve according to the defect information and the spectrum wavelength; and applying a hyperspectral image analysis algorithm to analyze the characteristic spectrum curve to obtain an analyze result and obtaining a target light source according to the analyze result.

14. The non-transitory storage medium according to claim 13, wherein acquiring the plurality of grayscale images of an object with a known defect comprises:

acquiring an image of the object under each of a plurality of light sources;

converting each of the acquired image through a gray scale conversion algorithm to obtain the plurality of grayscale images.

15. The non-transitory storage medium according to claim 14, wherein the gray scale conversion algorithm comprises any one of a floating-point algorithm, an integer algorithm, a shift algorithm, an average value algorithm, and a green-only algorithm.

16. The non-transitory storage medium according to claim 13, the method further comprising:

performing hyperspectral image analysis on the pseudo-hyperspectral image cube according to a preset analysis algorithm to obtain data, after generating the pseudo-hyperspectral image cube according to the plurality of grayscale images; and saving the data in a database.

17. The non-transitory storage medium according to claim 16, the method further comprising:

acquiring an image of a target object to be detect under the target light source, after obtaining a target light source according to the analyze result;

performing an optical detection on the image of the target object to obtain a result of detection or non-detection of a defect, wherein the result is used to determine whether the target object has the known defect.

* * * * *